US 12,223,837 B2

(12) United States Patent
Wei et al.

(10) Patent No.: US 12,223,837 B2
(45) Date of Patent: Feb. 11, 2025

(54) SYSTEMS AND METHODS FOR DETECTING FALSE POSITIVES IN COLLISION NOTIFICATIONS

(71) Applicant: Caterpillar Inc., Peoria, IL (US)

(72) Inventors: Mo Wei, Dunlap, IL (US); Jun Zuo, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 18/060,789

(22) Filed: Dec. 1, 2022

(65) Prior Publication Data
US 2024/0185719 A1    Jun. 6, 2024

(51) Int. Cl.
*G08G 1/16* (2006.01)

(52) U.S. Cl.
CPC ................. *G08G 1/165* (2013.01)

(58) Field of Classification Search
CPC ..................................... G08G 1/165
See application file for complete search history.

(56) References Cited

U.S. PATENT DOCUMENTS

| 8,370,056 | B2 | 2/2013 | Trombley et al. |
| 9,260,059 | B2 | 2/2016 | Rayes et al. |
| 10,151,830 | B2 * | 12/2018 | Cook .................... G08B 29/186 |
| 10,239,452 | B1 * | 3/2019 | Szczepaniak ......... B60W 50/14 |
| 2014/0200863 | A1 * | 7/2014 | Kamat ................... E02F 9/245 |
|  |  |  | 703/1 |
| 2016/0001701 | A1 * | 1/2016 | Pagliani ................ G01S 13/931 |
|  |  |  | 701/301 |
| 2019/0101641 | A1 * | 4/2019 | Hogan ..................... G01S 13/88 |
| 2022/0101635 | A1 * | 3/2022 | Koivisto .............. G06F 18/217 |
| 2023/0142299 | A1 * | 5/2023 | Pan ....................... G01S 17/931 |
|  |  |  | 701/301 |

FOREIGN PATENT DOCUMENTS

| DE | 102018209336 A1 * | 12/2019 | .............. B25J 19/06 |
| DE | 102021200634 A1 * | 9/2021 | ................ B60P 1/04 |
| DE | 102019204408 B4 * | 2/2023 | ........... G01S 13/589 |

* cited by examiner

*Primary Examiner* — Curtis A Kuntz
*Assistant Examiner* — James E Munion

(57) ABSTRACT

A collision detection system including a proximity sensor, positioning sensor, and controller. The controller includes a memory storing instructions, and a model of the machine that includes dimension information of the machine, location information of the proximity sensor, and pose information of movable portions of the machine. A processor is connected to the proximity sensor, positioning sensor, and memory, and is configured to update pose information of the model based on the pose of the movable portions determined using the positioning sensor. The processor may receive a detection of the object from the proximity sensor. The processor may determine an expected detection result of the proximity sensor using the model, and based on the location information of the proximity sensor and the updated pose information. The processor may compare the detection with the expected detection result to determine whether the detection results from the movable portion or a foreign object.

20 Claims, 4 Drawing Sheets

SYSTEMS AND METHODS FOR DETECTING FALSE POSITIVES IN COLLISION NOTIFICATIONS

TECHNICAL FIELD

The present disclosure relates generally to object detection systems, and more particularly, to object detection systems for detecting false positives in collision avoidance notifications for machines that change shape.

BACKGROUND

Existing collision alarming and avoidance system (CAAS) have been developed for non-shape changing machines, e.g., cars. For example, a sensor mounted on a non-shape changing machines may account for the detection of a part of the machine in its field-of-view (FOV). Since the detected part of the machine is relatively static, the area occupied by the detected part in the FOV may be pre-defined, and the CAAS system may ignore or apply a threshold to filter out the detected part of the machine. Furthermore, the CAAS system may simply assume the detected objects in the FOV as foreign objects by positioning the sensors to not include any part of the machine in their FOV. These mechanisms are not suitable for machines that change shape, e.g., digging machines, loading machines, hauling machines, etc., since parts of their body may enter or leave the FOV of the sensors causing false positives during collision avoidance notifications.

U.S. Pat. No. 10,151,830 B2 ("the '830 Patent"), describes a method for determining a detected object is a component of a machine by comparing, via a learned obstruction detection process, detection signals of the detected object with component-associated detection data, i.e., occurrences of the machine components within a pre-defined obstruction zone. However, the method described in the '830 Patent requires development of the learned obstruction detection process, e.g., via a training process that may be costly, complex, and/or time consuming to perform. Further, training the process for each different machine may require different training data, which may increase the difficulty of adapting the process to different machines.

The disclosed method and system may solve one or more of the problems set forth above and/or other problems in the art. The scope of the current disclosure, however, is defined by the attached claims, and not by the ability to solve any specific problem.

SUMMARY

In one aspect, a collision detection system for a machine that changes shape may include: at least one proximity sensor configured to detect an object in proximity to a location of the at least one proximity sensor, at least one positioning sensor configured to determine a pose of at least one movable portion of the machine, and a controller. The controller includes at least one memory storing instructions and a model of the machine, the model having dimension information of the machine, location information of the at least one proximity sensor, and pose information of the at least one movable portion of the machine. The controller further includes at least one processor that is operatively connected to the at least one proximity sensor, the at least one positioning sensor, and to the at least one memory, and that is configured to execute the instructions to perform operations, including: updating the pose information of the model based on the pose of the at least one movable portion determined using the at least one positioning sensor; receiving a detection of the object from the at least one proximity sensor; determining an expected detection result of the at least one proximity sensor using the model and based on the location information of the at least one proximity sensor and the updated pose information; comparing the detection with the expected detection result; and based on the comparing, determining whether the detection results from the at least one movable portion or from a foreign object.

In another aspect, a computer-implemented method for detecting collision for a machine that changes shape may include: detecting, via at least one positioning sensor, a pose of at least one movable portion of the machine; updating pose information of a model of the machine based on the pose of the at least one movable portion determined using the at least one positioning sensor, wherein the model includes dimension information of the machine, location information of at least one proximity sensor, and pose information of the at least one movable portion of the machine; detecting, via the at least one proximity sensor, a detection of an object in proximity to a location of the at least one proximity sensor; determining an expected detection result of the at least one proximity sensor using the model and based on the location information of the at least one proximity sensor and the updated pose information; and comparing the detection with the expected detection result to determine whether the detection results from the at least one movable portion or from a foreign object.

In a further aspect, a non-transitory computer readable medium for detecting collision for a machine that changes shape, the non-transitory computer readable medium storing instructions which, when executed by one or more processors, may cause the one or more processors to perform operations including: detecting, via at least one positioning sensor, a pose of at least one movable portion of the machine; updating pose information of a model of the machine based on the pose of the at least one movable portion determined using the at least one positioning sensor, wherein the model includes dimension information of the machine, location information of at least one proximity sensor, and pose information of the at least one movable portion of the machine; detecting, via the at least one proximity sensor, a detection of an object in proximity to a location of the at least one proximity sensor; determining an expected detection result of the at least one proximity sensor using the model and based on the location information of the at least one proximity sensor and the updated pose information; and comparing the detection with the expected detection result to determine whether the detection results from the at least one movable portion or from a foreign object.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Conventional CAAS systems may be unable to distinguish whether the object entering or leaving the FOV of a sensor is a movable portion of the machine or a foreign object. For example, sensors mounted on machines that change shape, e.g., hydraulic excavators, may detect movable portions of the hydraulic excavators, e.g., boom, within its FOV. The CAAS system may trigger collision notifications despite the detected objects being a movable portion of the machine. Such false collision notifications may diminish system reliability and may significantly affect the effectiveness of the system. There is a need for advances in technology for detecting false positives in collision avoidance notifications for machines that change shape. And, while learning models have been developed, the necessity of amassing training data to develop such models may be difficult, complex, and/or costly. Moreover, a learning model may be trained specifically for a particular machine, and may be difficult to adapt to different machines.

Figure 1:
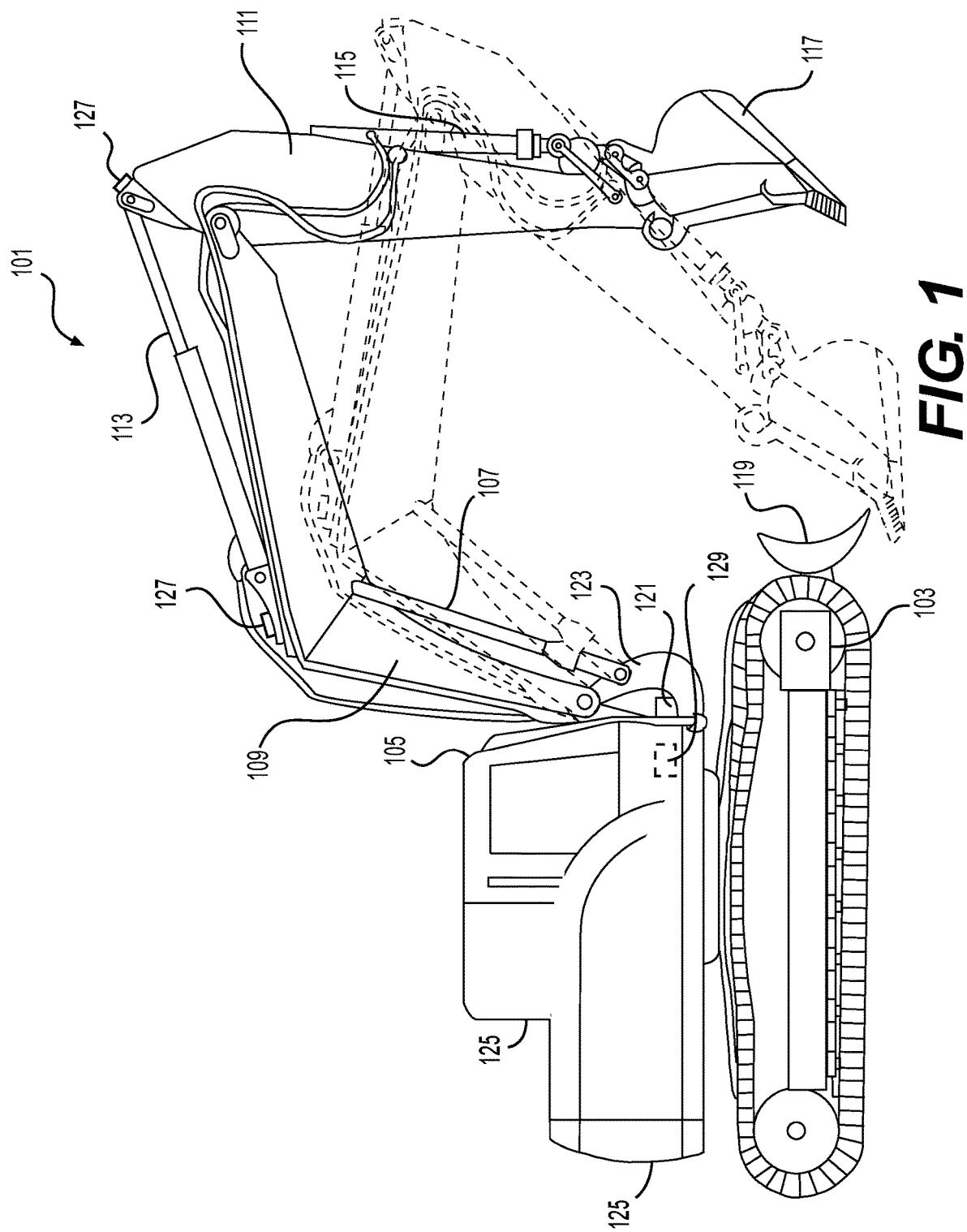
FIG. 1 is a schematic diagram of an exemplary machine that changes shape, according to aspects of the disclosure.

FIG. 1 is a schematic diagram of an exemplary shape-changing machine 101. Although FIG. 1 illustrates machine 101 as being an excavator, machine 101 may include any type of machine, such as digging machines (excavators, backhoes, dozers, drilling machines, trenchers, draglines, or any other suitable work machines), loading machines (wheeled or tracked loader, a front shovel, an excavator, a cable shovel, a stack reclaimer, or any other similar machines), hauling machines (articulated truck, an off-highway truck, an on-highway dump truck, a wheel tractor scraper, or any other similar machine), or any other machines that change shape.

Machine 101 may include an engine (not illustrated in FIG. 1), tracks 103, cabin 105, first hydraulic actuator 107, a boom 109, a stick 111, second hydraulic actuator 113, third hydraulic actuator 115, first implement 117 (illustrated as bucket 117, for example), second implement 119 (illustrated as a blade 119, for example), boom link 121 fixedly connected to cabin 105, swing casting 123 fixedly connected to an end of boom 109 and to boom link 121, proximity sensor 125, positioning sensor 127, and control system 129. In one instance, boom 109 fixedly connected to boom link 121 via swing casting 123 may rotate, via rotation of swing casting 123, in a horizontal or a vertical direction. Boom 109 may be further fixedly connected at another end to stick 111, and stick 111 may be fixedly connected at another end to bucket 117. The first hydraulic actuator 107 may be connected to boom 109 to actuate boom 109; second hydraulic actuator 113 may be connected to boom 109 and stick 111 to actuate stick 111; and third hydraulic actuator 115 may be connected to stick 111 and bucket 117 to actuate bucket 117. In addition, machine 101 may be configured with one or more actuators to move blade 119, e.g., to change the vertical position of blade 119, to angle blade 119 toward a left or right side of machine 101, etc.

Cabin 105 is configured to enclose an operator therein, and may include various controls mounted therein for controlling the operation of, for example, the engine, tracks 103, boom 109, stick 111, bucket 117, and blade 119. In some examples, an operator may use the controls within cabin 105 to move machine 101 using tracks 103. The operator may further articulate boom 109 and stick 111 to position bucket 117 or blade 119. The operator may use various controls to tilt, rotate, and scoop or curl bucket 117 to perform various tasks. Similarly, the operator may use various controls to adjust the height, rotation, angle, etc. of blade 119. Although FIG. 1 illustrates bucket 117 and blade 119 as example implements, other implements may be used, such as a drill, cutters, a breaker, a scraper, etc. In one instance, cabin 105 may include a collision alarm. The collision alarm may include various user interface elements that employ various application programming interfaces (APIs) or other function calls to enable the display of a graphical user interface (GUI), and interfacing of an aural/visual collision alarm notifications.

As further illustrated in FIG. 1, machine 101 may include one or more proximity sensor 125 and one or more positioning sensor 127. Proximity sensor 125 may be placed on any part of machine 101, e.g., attached to cabin 105. In one instance, proximity sensor 125 may include an optical proximity sensor, an ultrasonic proximity sensor, an inductive proximity sensor, a capacitive proximity sensor, a magnetic proximity sensor, or any other type of proximity sensor. Proximity sensors 125 may be implemented using a variety of techniques including lasers, sonar, and ultrasound to determine the distance between proximity sensor 125 and a nearby object. Depending on the type and capabilities of proximity sensor 125, the distance may be provided in a variety of formats and/or resolutions including feet, inches, centimeters, millimeters, micrometers, nanometers, etc. In addition to the distance, proximity sensor 125 may measure the velocity of the detected object. For example, proximity sensor 125 may determine the velocity of an object by comparing a current measured distance and time with a previously measured distance at a previous time. The measured distance and/or velocity may be transmitted by proximity sensors 125 to control system 129. In one instance, proximity sensor 125 may transmit its location information, e.g., position, angle, orientation, etc., on machine 101 to control system 129.

Positioning sensor 127 may be placed on any parts of machine 101, e.g., fixedly connected to boom 109, stick 111, bucket 117, and/or swing casting 123 via one or more mechanical links, e.g., a 2-bar linkage, a 4-bar linkage, etc. In one instance, positioning sensor 127 may include a rotary potentiometer, a hall-effect sensor, a capacitive position sensor, a linear voltage differential transformer, a magnetostrictive linear position sensor, a fiber-optics position sensor, an optical position sensor, or any other type of positioning sensor. Positioning sensors 127 may detect, in real-time or near real-time, angle, height, orientation, and/or other positions of the various movable portions of machine 101. Proximity sensor 125 and positioning sensor 127 may be communicatively connected to control system 129.

As will be discussed in further detail below, control system 129 may have hardware and/or software-based components for monitoring, controlling, and communicating with machine 101, such as the engine, tracks 103, boom 109, stick 111, bucket 117, blade 119, proximity sensor 125, and/or positioning sensor 127. Control system 129 may include one or more computing devices, processors, and/or memory located onboard machine 101 or located remotely from machine 101. In this way, certain aspects of the disclosure may process data remotely from proximity sensor 125, positioning sensor 127, and/or machine 101. In the illustrated example, the memory of control system 129 may store software-based components to perform various processes and techniques described herein, including the methods illustrated in FIG. 3 and/or FIG. 4.

Figure 2:
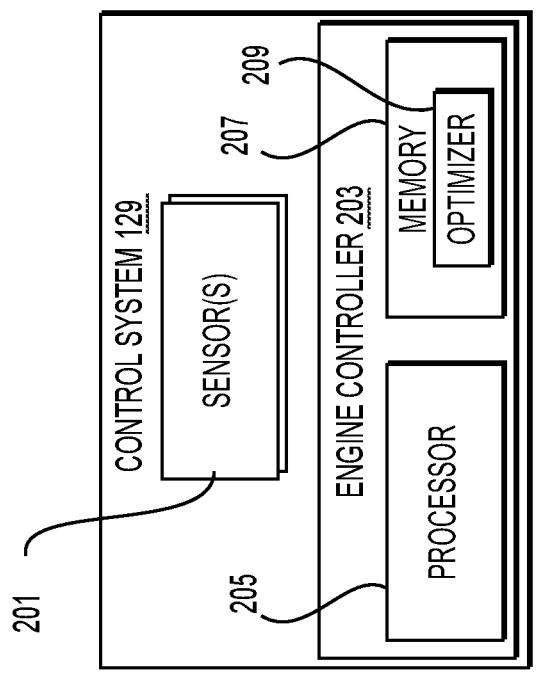
FIG. 2 is a diagram of the components of a control system of the machine of FIG. 1, according to aspects of the disclosure.

FIG. 2 is a diagram of the components of control system 129, according to aspects of the disclosure. Control system 129 includes one or more components that cooperate for detecting false positives in collision avoidance notifications for machines that change shape. By way of example, control system 129 includes sensors 201 and engine controller 203.

By way of example, sensor 201 may be any type of sensor. In one instance, sensors 201 may include, for example, proximity sensors, positioning sensors, inertial measurement unit (IMU) sensors, light detection and ranging (LIDAR), a RADAR, a gyroscope, an accelerometer, a magnetometer, an infrared sensor, a camera, a microphone, etc. In another instance, sensors 201 may include, for example, a network detection sensor for detecting wireless signals or receivers for different short-range communications (e.g., Bluetooth, Wi-Fi, Li-Fi, near field communication (NFC), etc.), a global positioning sensor for gathering location data, a camera/imaging sensor for gathering image data, an audio recorder for gathering audio data, and the like. Any suitable type of sensor, and any suitable arrangement of one or more sensors 201, may be used. Generally, a sensor may be configured to generate a signal indicative of values associated with angle, height, orientation, and/or other positions of the various movable portions of machine 101, or values associated with distance and/or velocity of nearby objects, e.g., that may be received and interpreted by the engine controller 203 and/or other components of machine 101. In one instance, sensor 201 is a smart sensor with built-in processor 205 and memory 207, and may be configured to perform various functions, like digital processing, code conversion of analog to digital, interfacing functions, and calculations. For example, the smart sensors may perform one or more functions associated with the functions of control system 129. The smart sensors may also determine when data needs to be stored or deleted in accordance with the input they collect.

In some aspects, control system 129 may receive data from proximity sensor 125 and positioning sensor 127. Control system 129 may update a dynamic model for movable portions of machine 101, e.g., boom 109, stick 111, bucket 117, and blade 119, based at least in part, on the data, e.g., detection points, received from positioning sensor 127. For example, the movable portions of machine 101 may comprise specific dimensions, e.g., width, length, thickness, etc., and may be positioned at a particular angle. Control system 129 may receive pose information, e.g., position and orientation, for these movable portions from positioning sensor 127. Control system 129 may update, in real-time or near real-time, the pose information in the dynamic model for the movable portions based on the received pose information from positioning sensor 127. When these movable portions move, the dynamic model may generate a prediction for what the proximity sensors 125 would expect to detect from the movable portions of machine 101. Control system 129 may receive location information from proximity sensor 125, e.g., the location of proximity sensor 125 on machine 101. Control system 129 may predict proximity sensor 125 may detect a specific object in its FOV based on its location on machine 101. Control system 129 may compare the detection points of the nearby object to the model-based prediction from the dynamic model. Control system 129 may also compare the detection points of the object to the detection points of other sensor 201 positioned at various locations of machine 101. After performing a set of computations following an algorithm (as will be discussed in detail below), control system 129 may determine the object to be a moving portion of machine 101, e.g., boom 109, stick 111, bucket 117, blade 119, and the collision notification may be suppressed. Otherwise, control system 129 may determine the detected object is not a part of machine 101 and may trigger the collision notification.

Engine controller 203 may be operatively connected to sensor 201 and/or other components of machine 101. Engine controller 203 may include processor 205 and memory 207. Various other suitable components, e.g., power supply circuitry, signal conditioning or processing circuitry, or the like, may also be included in the engine controller 203 in various embodiments. Although depicted as a single element in FIG. 2, it should be understood that engine controller 203, in some embodiments, may be distributed over a plurality of elements in any suitable arrangement.

In one instance, processor 205 may include a central processing unit (CPU), a graphics processing unit (GPU), a microprocessor, a digital signal processor and/or other processing units or components. Additionally, or alternatively, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor 205 may possess its own local memory, which also may store program modules, program data, and/or one or more operating systems. The processor may include one or more cores.

In one instance, memory 207 may be a non-transitory computer-readable medium that may include volatile and/or nonvolatile memory, removable and/or non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device (e.g., a user device, a server device, etc.). Memory 207 may be implemented as computer-readable storage media (CRSM), which may be any available physical media accessible by the processor to execute instructions stored on the memory. Memory 207 may have an operating system (OS) and/or a variety of suitable applications stored thereon. The OS, when executed by processor 205, may enable management of hardware and/or software resources of control system 129. Memory 207 may store data and/or software, e.g., instructions, models, algorithms, equations, data tables, or the like, that are usable and/or executable by the processor 205 to perform one or more operations for detecting false positives in collision avoidance notifications for machines that change shape. For example, memory 207 may include an optimizer 209 that, when executed by processor 205, is configured to generate engine commands that optimize the operation of machine 101.

INDUSTRIAL APPLICABILITY

The disclosed methods and systems for detecting false positives in collision avoidance notifications may be used in any type of machine that changes shape to perform some type of operation associated with an industry such as construction, mining, farming, transportation, or any other industry known in the art. False positive in collision avoidance notifications may disrupt a planned path of movement for machine 101, whether the machine is being operated in a manual, autonomous, or semi-autonomous mode. The methods and systems avoid false positives in collision avoidance notifications by using the dynamic model that (i) clusters sensor data, e.g., detection points, from the plurality of sensors associated with the machine, (ii) matches each of the sensor data with model-based prediction to calculate a confidence score, and (iii) fuses the confidence scores to determine that the sensors are detecting movable part of the machine in their FOV. In this way, certain aspects of the disclosure may help to maintain the accuracy of the collision avoidance notifications during operations of machine 101 by suppressing false positive detection of movable portions associated with machine 101. In one instance, the movable portion of machine 101 may include any parts of machine 101 that may change their position relative to any other parts of machine 101. Such change in the position of the parts may result from the movement of the parts themselves or the movement of other parts relative to the parts. For example, a non-shape-changing part of machine 101, e.g., an undercarriage, may enter or exit the FOV of sensor 201, while a shape-changing part of machine 101, e.g., a boom, and sensor 201 attached thereto moves relative to the non-shape-changing part of machine 101. The non-shape-changing part of machine 101 is relatively moving from the sensor coordinate system based on the movement of the shape-changing part of machine 101, and thus either or both of the non-shape-changing part or the shape-changing part may be considered a portion of the machine that is moveable.

Figure 3:
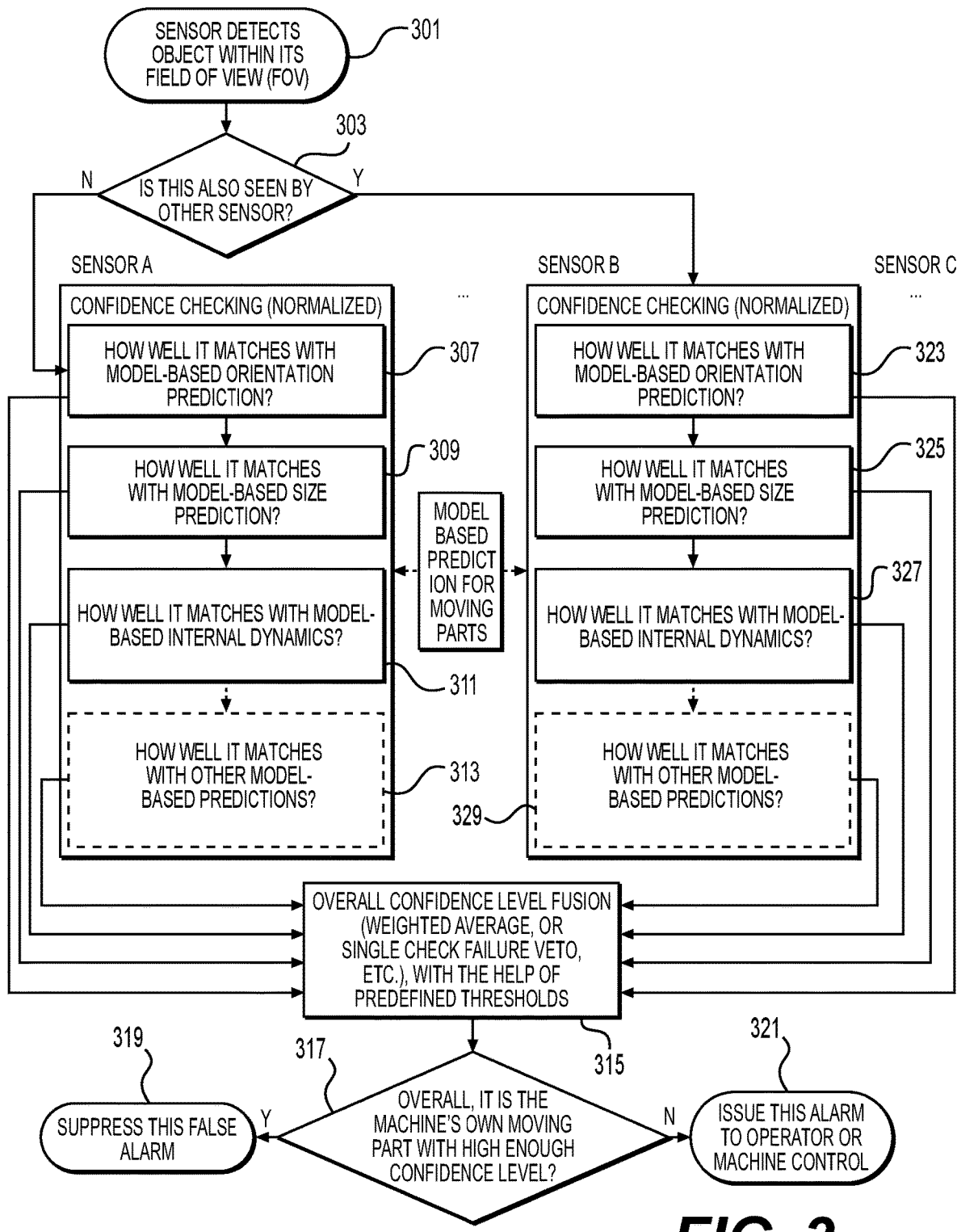
FIG. 3 illustrates a flowchart depicting an exemplary method for evaluating confidence level of sensor data, according to aspects of the disclosure.

FIG. 3 illustrates a flowchart depicting an exemplary method for evaluating the confidence level of sensor data detected by one or more sensors, e.g., sensor 201, positioned on machine 101 of FIG. 1, according to aspects of the disclosure. Although the flowchart is illustrated and described as a sequence of steps, it is contemplated that various embodiments of the flowchart may be performed in any order or combination and need not include all of the illustrated steps.

In step 301, a sensor, e.g., proximity sensor 125, may detect an object entering its FOV, and the sensor may transmit, in real-time or near real-time, the sensor data, e.g., detection points, to control system 129. For example, first hydraulic actuator 107 may include one or more mechanical, hydraulic, or electric components configured to cause boom 109 to rotate in a horizontal or vertical plane. As described elsewhere herein, proximity sensor 125 communicatively coupled to control system 129 via one or more wired and/or wireless communication channels may provide sensor data related to the distance and velocity of boom 109. In step 303, control system 129 may monitor, in real-time or near real-time, other sensors, e.g., positioning sensor 127 or any sensors 201, to determine whether the other sensors detected the object in their FOV. For example, positioning sensor 127 communicatively coupled to control system 129 via one or more wired and/or wireless communication channels may provide sensor data related to the position of boom 109.

In one instance, control system 129 may determine the object is detected by a single sensor, e.g., proximity sensor 125, associated with machine 101. In step 307, control system 129 may compare the sensor data to a model-based orientation prediction. Control system 129 may assign a high confidence score to the sensor data upon determining the sensor data matches the model-based orientation prediction, or a low confidence score upon determining discrepancies between the sensor data and the model-based orientation prediction. In step 309, control system 129 may compare the sensor data to a model-based size prediction, and may generate a confidence score for the sensor data based, at least in part, on the matching between the sensor data and the model-based size prediction. For example, a confidence score may be higher or lower depending on whether a size predicted for the detected object is different or similar to a size of a movable part of the machine expected to be detected by the sensor. In step 311, control system 129 may compare the sensor data to a model-based internal dynamics, wherein the model-based internal dynamics include connection between boom, stick, and bucket, and/or various other attributes of machines 101. Control system 129 may generate a confidence score for the sensor data based, at least in part, on the matching. In step 313, control system 129 may compare the sensor data to various other model-based predictions, e.g., length predictions, shape predictions, etc., and may calculate a confidence score for the sensor data based, at least in part, on the comparison. In some embodiments, the sensor 125 may be a smart sensor with an onboard processor 205 and memory 207, and in addition to or instead of the control system 129, may be configured to generate one or more confidence score regarding a detected object.

In step 315, control system 129 may perform a plurality of computations, e.g., weighted average, single check failure veto, etc., to fuse the one or more confidence scores to generate a single scalar overall confidence score. In step 317, control system 129 may compare the single scalar overall confidence score to a pre-determined threshold to determine whether the object is a movable portion of machine 101 or a foreign object. Control system 129 may suppress the false collision avoidance notifications upon determining the single scalar overall confidence score satisfies the pre-determined threshold level indicating the detected object is the movable portion of machine 101 (step 319). Control system 129 may authorize the collision avoidance notifications upon determining the single scalar overall confidence score is below the pre-determined threshold level indicating the detected object is not a component of machine 101 and is a foreign object (step 321). In one instance, a foreign object is any object not attached to, or otherwise not functionally associated with machine 101 at a time in which object detection occurs.

In one instance, control system 129 may determine the object is detected by a plurality of sensors, e.g., positioning sensor 127 and/or any of sensor 201, associated with machine 101. This may be achieved by using various classification/compare algorithms, such as clustering of reflected points/detections and comparing them to other sensors' detections. If the object is detected by a plurality of sensors, control system 129 may compare sensor data from each of the plurality of sensors to a model-based prediction for moving parts of machine 101, e.g., orientation prediction (step 323), a model-based size prediction (step 325), a model-based internal dynamics (step 327), and/or various other model-based predictions (steps 329) to generate confidence scores. A description for such comparison and score generation has been described in detail elsewhere herein. In one instance, one or more of the foregoing steps 323-329 may be repeated for any number of sensors associated with machine 101 that detects the object in their FOV. In some instances, the method above may be performed continuously, periodically, per schedule, in real-time or near real-time, or the like. Such comparison between sensor data and model-based prediction for moving parts of machine 101 may be added or skipped depending on configuration and requirements.

Control system 129 may perform a plurality of computations to fuse the confidence scores for each of the plurality of sensors to generate a single scalar overall confidence score. Control system 129 may compare the single scalar overall confidence score to a pre-determined threshold to determine whether the detected object is a movable portion of machine 101 or a foreign object. A detailed description of such computation has been provided elsewhere herein.

Figure 4:
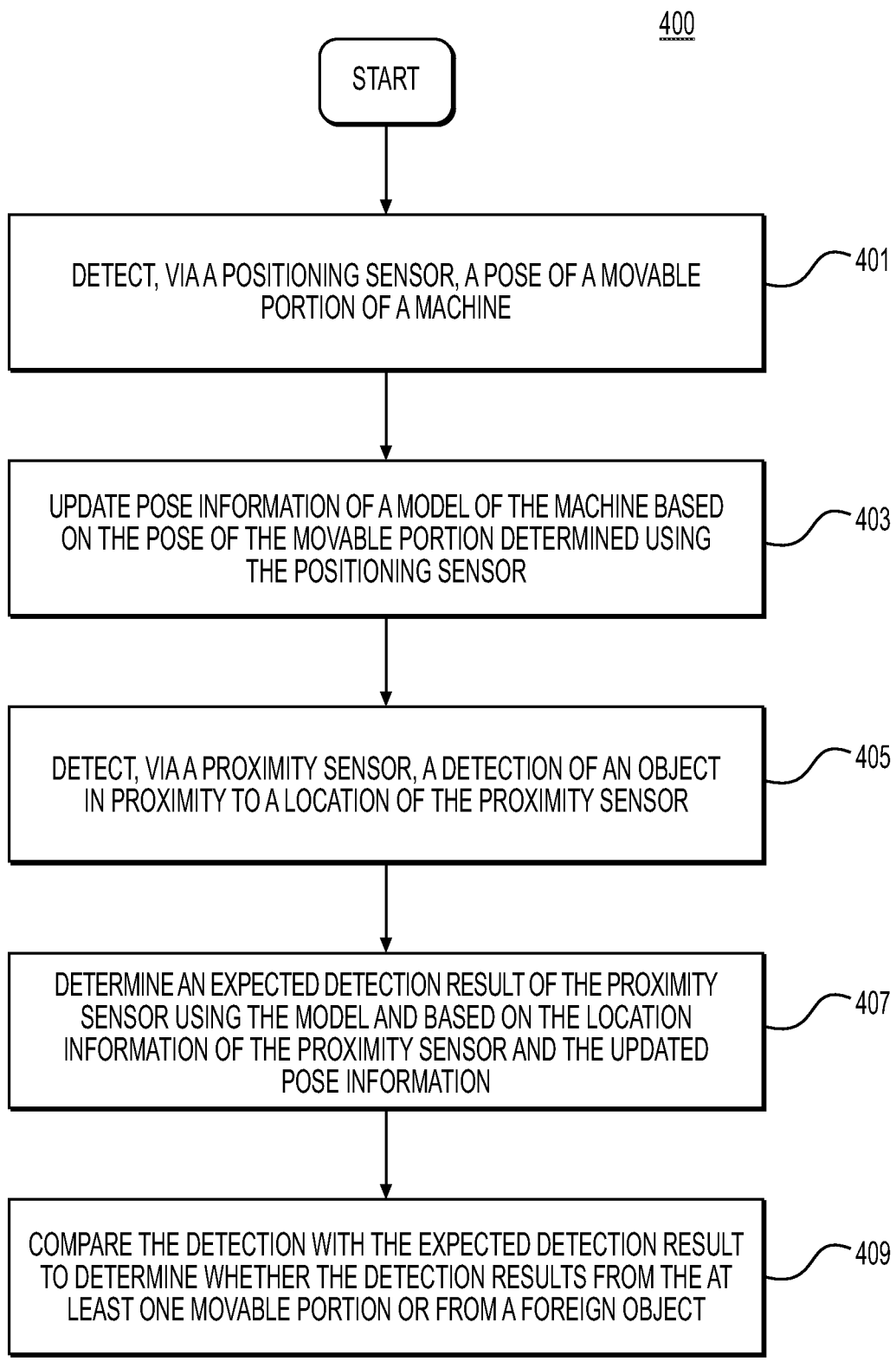
FIG. 4 illustrates a flowchart depicting an exemplary method for suppressing false positives in collision avoidance notifications for machines that change shape, according to aspects of the disclosure.

FIG. 4 illustrates a flowchart depicting an exemplary method for suppressing false positives in collision avoidance notifications for machines that change shape, according to aspects of the disclosure. In various instances, control system 129 may provide means for accomplishing various parts of process 400, as well as means for accomplishing embodiments of other processes described herein in conjunction with other components of process 400. Although process 400 is illustrated and described as a sequence of steps, it is contemplated that various embodiments of process 400 may be performed in any order or combination and need not include all of the illustrated steps.

In step 401, positioning sensor 127 that is configured to determine a pose of movable portion of machine 101, e.g., e.g., tracks 103, boom 109, stick 111, bucket 117, blade 119, may transmit the pose information to control system 129. In one instance, pose information may include a variety of parameters relating to position, orientation, and/or motion of the movable portion of machine 101 in a three dimensional coordinate system. Pose information may correspond to roll, pitch, and yaw information of the movable portion of machine 101. Pose information may further include a timestamp identifying the time at which the movable portion was at a specific pose.

In step 403, control system 129 may update the pose information of the dynamic model based on the pose of the one or more movable portions determined using positioning sensor 127. The dynamic model may include dimension information of the machine, location information of at least one proximity sensor, and pose information of the one or more movable portion of machine 101. In one instance, control system 129 may compare the pose information of the dynamic model to the pose information of the movable portions of machine 101. During the comparison, control system 129 may detect discrepancies between the pose information. Such discrepancy may occur due to various factors, e.g., weather conditions (heavy wind, rain, or snow), work conditions (bucket 117 or blade 119 is lifting heavy weights, or tracks 103 is on an uneven surface), condition of the machine (maintenance or age of machine 101), that may negatively impact the regular/normal pose of the movable portions of machine 101. Control system 129 may determine, based on the dimension information of the movable parts of machine 101, the change in pose information of the specific movable portions of machine 101, and may update the pose information of the dynamic model for that specific movable portions of machine 101. Such update may incur continuously, periodically, per schedule, in real-time or near real-time, or the like.

In step 405, proximity sensor 125 may detect, in real-time or near real-time, an object within a pre-determined location threshold, and may transmit proximity information and/or velocity information of the object to control system 129. In one instance, proximity information may indicate the distance between proximity sensor 125 and the detected object. In one instance, velocity information may indicate the speed at which the object is approaching proximity sensor 125 and/or machine 101.

In one instance, control system 129 may monitor, in real-time or near real-time, other sensors, e.g., proximity sensors 125 or any of sensors 201, associated with machine 101 for detection of the object. The other sensors may transmit, in real-time or near real-time, sensor data regarding the object to control system 129. Control system 129 may determine at least one further expected detection results for each of the sensor data from the other sensors using the dynamic model and based on the location information of the other proximity sensors and the updated pose information. Control system 129 may compare the sensor data from other sensors to the expected detection results, e.g., a model-based orientation prediction, a model-based dimension prediction, a model-based internal dynamic prediction, and/or any other model-based prediction to generate confidence scores. The confidence scores may be fused to generate a single scalar overall confidence score, e.g., total confidence score, for comparison to a pre-determined threshold. In one instance, control system 129 may apply a single failure veto analysis to at least one confidence score associated with an essential feature of the machine. For example, a confidence score associated with one movable portion of machine 101 may be given preference over the other based, at least in part, on preconfigured rules, system requirements, preference information, or any other factors.

In one instance, the sensor data may include a plurality of detection points for the detected object(s) from plurality of proximity sensors 125. Control system 129 may cluster the plurality of detection points to determine an orientation of the clustered detection points. It is understood that control system 129 may implement any clustering mechanisms to cluster the plurality of detected points, e.g., density-based clustering, hierarchical clustering, distribution-based clustering, etc. Control system 129 may calculate a center point based, at least in part, on a mean square center of the clustered detection points. It is understood that any other calculations or equations, e.g., root mean square, may be implemented to calculate the center point of the clustered detection points. In one instance, control system 129 may calculate a weighted average of the detection points based, at least in part, on distance information from the center point to the other detection points. Control system 129 may calculate a relative location of movable portions based, at least in part, on the yaw angle of machine 101 determined via positioning sensor 127. It is understood that any other calculations or equations may be applied to calculate the relative location of movable portions.

In step 407, control system 129 may determine an expected detection result of proximity sensor 125 using the dynamic model and based on the location information of proximity sensor 125 and the updated pose information. In one instance, the expected detection result indicates predicted orientation, predicted angle, predicted location, predicted dimension, etc., for the movable portions of machine 101.

In step 409, control system 129 may compare the detection with the expected detection result to determine whether the detection results from a movable portion of machine 101 or from a foreign object. In one instance, control system 129 may generate, via a collision alarm, a collision warning notification to operator of machine 101 upon determining the detection results from the foreign object. In one instance, control system 129 may suppress the detection of the object by the proximity sensor 125 upon determining the detection results from the movable portion of machine 101.

In this way, certain aspects of the disclosure may provide a better solution for machines with moving elements than the current systems that provide a static mask over the FOV and simply ignores the objects detected within the masked area. Effectively utilizing the methods and systems of the disclosure may allow a collision avoidance system to know that machine-associated components are not foreign objects, thereby facilitating in maintaining accuracy, enhancing reliability, and improving effectiveness of the collision avoidance system. For example, the methods and systems may determine that the object entering the FOV of the sensor is a movable portion of machine 101, and may suppress collision avoidance notifications.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A collision detection system for a machine that changes shape, the collision detection system comprising:
    at least one proximity sensor configured to detect an object in proximity to a location of the at least one proximity sensor;
    at least one positioning sensor configured to determine a pose of at least one movable portion of the machine; and
    a controller that includes:
        at least one memory storing instructions and a model of the machine, the model having dimension information of the machine, location information of the at least one proximity sensor, and pose information of the at least one movable portion of the machine; and
        at least one processor that is operatively connected to the at least one proximity sensor, the at least one positioning sensor, and to the at least one memory, and that is configured to execute the instructions to perform operations, including:
            updating the pose information of the model based on the pose of the at least one movable portion determined using the at least one positioning sensor;
            receiving a detection of the object within a predetermined location threshold from the at least one proximity sensor, wherein the detection includes speed at which the object is approaching the at least one proximity sensor and/or the machine;
            determining an expected detection result of the at least one proximity sensor using the model and based on the location information of the at least one proximity sensor and the updated pose information;
            comparing the detection with the expected detection result; and
            based on the comparing, determining whether the detection results from the at least one movable portion or from a foreign object.

2. The collision detection system of claim 1, further comprising:
    a collision alarm, wherein the operations further include selectively:
        generating, via the collision alarm, a collision warning notification upon determining the detection results from the foreign object; or
        suppressing the detection of the object by the at least one proximity sensor upon determining the detection results from the at least one movable portion.

3. The collision detection system of claim 1, wherein:
    the at least one proximity sensor includes a plurality of proximity sensors;
    the detection is received from a proximity sensor of the plurality of proximity sensors; and
    the operations further include:
        monitoring, in real-time or near real-time, the plurality of proximity sensors associated with the machine for detection of the object;
        receiving at least one further detection of the object from at least one further proximity sensor of the plurality of proximity sensors;
        determining at least one further expected detection result for each of the at least one further proximity sensors using the model and based on the location information of the at least one further proximity sensors and the updated pose information;
        comparing the at least one further detection with the at least one further expected detection results; and
        the determining of whether the detection results from the at least one movable portion or from the foreign object is further based on the comparing of the at least one further detection with the at least one further expected detection results.

4. The collision detection system of claim 3, wherein, in each case, expected detection results include a model-based orientation prediction, a model-based dimension prediction, and a model-based internal dynamic prediction.

5. The collision detection system of claim 4, wherein:
    the operations further include:
        generating, for each proximity sensor of the plurality of proximity sensors, one or more confidence scores based, at least in part, on a comparison of a detection of the proximity sensor with the an expected detection result for the proximity sensor;

fusing the one or more confidence scores of the plurality of proximity sensors to generate a total confidence score; and comparing the total confidence score to a pre-determined confidence threshold, wherein the determining is further based on the comparing of the total confidence score to the pre-determined threshold.

6. The collision detection system of claim 3, wherein the operations further include:

clustering a plurality of detections from the plurality of proximity sensors;

determining, based on the clustering, an orientation of the clustered detections;

calculating a center point based, at least in part, on a mean square center of the clustered detections; and calculating a relative location of the at least one movable portion based, at least in part, on a yaw angle of the machine determined via the at least one positioning sensor.

7. The collision detection system of claim 6, wherein the operations further include:

calculating a weighted average of the plurality of detections based, at least in part, on distance information from the center point.

8. The collision detection system of claim 6, wherein the operations further include:

applying a single failure veto analysis to at least one confidence score associated with an essential feature of the machine, wherein the determining is further based on the single failure veto analysis.

9. The collision detection system of claim 1, wherein the machine comprises an excavator, and wherein the excavator comprises a boom assembly configured to pivot along a horizontal plane or a vertical plane.

10. The collision detection system of claim 9, wherein the boom assembly includes a boom connected to a stick, and the stick connected to a bucket, and wherein the boom, the stick, and the bucket are movable via one or more actuators.

11. A computer-implemented method for detecting collision for a machine that changes shape, comprising:

detecting, via at least one positioning sensor, a pose of at least one movable portion of the machine;

updating pose information of a model of the machine based on the pose of the at least one movable portion determined using the at least one positioning sensor, wherein the model includes dimension information of the machine, location information of at least one proximity sensor, and pose information of the at least one movable portion of the machine;

detecting, via the at least one proximity sensor, an object within a pre-determined location threshold from a location of the at least one proximity sensor, wherein the detection includes speed at which the object is approaching the at least one proximity sensor and/or the machine;

determining an expected detection result of the at least one proximity sensor using the model and based on the location information of the at least one proximity sensor and the updated pose information; and comparing the detection with the expected detection result to determine whether the detection results from the at least one movable portion or from a foreign object.

12. The computer-implemented method of claim 11, further comprising:

generating, via a collision alarm, a collision warning notification upon determining the detection results from the foreign object; or suppressing the detection of the object by the at least one proximity sensor upon determining the detection results from the at least one movable portion.

13. The computer-implemented method of claim 11, further comprising:

monitoring, in real-time or near real-time, a plurality of proximity sensors associated with the machine for detection of the object;

receiving at least one further detection of the object from at least one further proximity sensor of the plurality of proximity sensors;

determining at least one further expected detection result for each of the at least one further proximity sensors using the model and based on the location information of the at least one further proximity sensors and the updated pose information;

comparing the at least one further detection with the at least one further expected detection results; and determining whether the detection results from the at least one movable portion or from the foreign object further based on the comparing of the at least one further detection with the at least one further expected detection results.

14. The computer-implemented method of claim 13, wherein, in each case, expected detection results include a model-based orientation prediction, a model-based dimension prediction, and a model-based internal dynamic prediction.

15. The computer-implemented method of claim 14, further comprising:

generating, for each proximity sensor of the plurality of proximity sensors, one or more confidence scores based, at least in part, on a comparison of a detection of the proximity sensor with the an expected detection result for the proximity sensor;

fusing the one or more confidence scores of the plurality of proximity sensors to generate a total confidence score; and comparing the total confidence score to a pre-determined confidence threshold, wherein the determining is further based on the comparing of the total confidence score to the pre-determined threshold.

16. The computer-implemented method of claim 13, further comprises:

clustering a plurality of detections from the plurality of proximity sensors;

determining, based on the clustering, an orientation of the clustered detections;

calculating a center point based, at least in part, on a mean square center of the clustered detections; and calculating a relative location of the at least one movable portion based, at least in part, on a yaw angle of the machine determined via the at least one positioning sensor.

17. The computer-implemented method of claim 16, further comprising:

calculating a weighted average of the plurality of detections based, at least in part, on distance information from the center point; or applying a single failure veto analysis to at least one confidence score associated with an essential feature of the machine, wherein the determining is further based on the single failure veto analysis.

18. A non-transitory computer readable medium for detecting collision for a machine that changes shape, the non-transitory computer readable medium storing instructions which, when executed by one or more processors, cause the one or more processors to perform operations comprising:

detecting, via at least one positioning sensor, a pose of at least one movable portion of the machine;

updating pose information of a model of the machine based on the pose of the at least one movable portion determined using the at least one positioning sensor, wherein the model includes dimension information of the machine, location information of at least one proximity sensor, and pose information of the at least one movable portion of the machine;

detecting, via the at least one proximity sensor, a detection of an object within a pre-determined location threshold from a location of the at least one proximity sensor, wherein the detection includes speed at which the object is approaching the at least one proximity sensor and/or the machine;

determining an expected detection result of the at least one proximity sensor using the model and based on the location information of the at least one proximity sensor and the updated pose information; and comparing the detection with the expected detection result to determine whether the detection results from the at least one movable portion or from a foreign object.

19. The non-transitory computer readable medium of claim 18, further comprising:

generating, via a collision alarm, a collision warning notification upon determining the detection results from the foreign object; or suppressing the detection of the object by the at least one proximity sensor upon determining the detection results from the at least one movable portion.

20. The non-transitory computer readable medium of claim 18, further comprises:

monitoring, in real-time or near real-time, a plurality of proximity sensors associated with the machine for detection of the object;

receiving at least one further detection of the object from at least one further proximity sensor of the plurality of proximity sensors;

determining at least one further expected detection result for each of the at least one further proximity sensors using the model and based on the location information of the at least one further proximity sensors and the updated pose information;

comparing the at least one further detection with the at least one further expected detection results; and determining whether the detection results from the at least one movable portion or from the foreign object further based on the comparing of the at least one further detection with the at least one further expected detection results.

* * * * *